Aug. 4, 1936. H. W. SAMUELSON 2,049,825
ANTISKID CHAIN
Filed Feb. 21, 1935
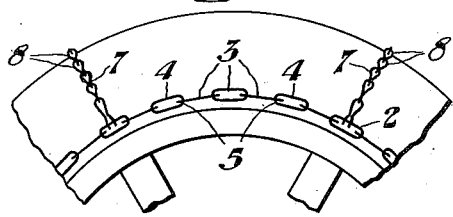
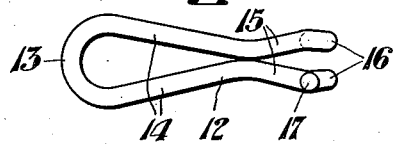
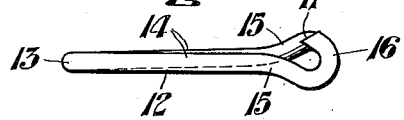
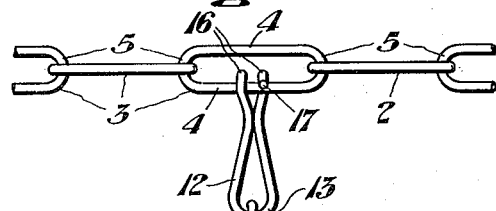
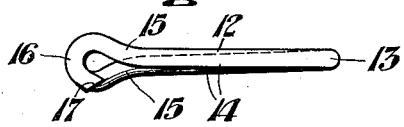
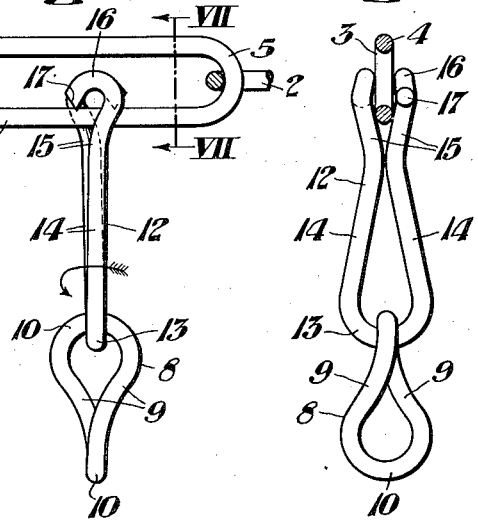
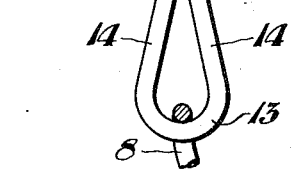
Inventor:
HERBERT W. SAMUELSON,
by his Attorneys.

Patented Aug. 4, 1936

2,049,825

UNITED STATES PATENT OFFICE 2,049,825

ANTISKID CHAIN

Herbert W. Samuelson, Norwalk, Conn.

Application February 21, 1935, Serial No. 7,617

5 Claims. (Cl. 24—230.5)

This invention relates to anti-skid chains and more particularly to those which are used on vehicle wheels and consist of two side-chains which extend circumferentially and lie on opposite sides of the tire together with a plurality of cross-chains which interconnect the former.

Anti-skid chains of the type referred to are extremely troublesome due to the fact that the cross-chains are subjected to a great amount of wear and severe strain, which necessitates their frequent renewal. In order to renew these links, it is usually necessary to employ tools and devote considerable time to the operation.

Numerous attempts have been made to eliminate these difficulties by providing so-called "quick detachable connecting links" which join the cross-links to the side links of the chain, but have not been met with much success. This is largely for the reason that such connectors, requiring as they do, the necessity of tools, frequently stick; and if made too easily removable are apt to come apart in service. In addition, such connecting links invariably have a deleterious effect on rubber tires in that their open ends make contact therewith.

One of the objects of the present invention is to provide an anti-skid chain utilizing a novel connecting link for joining the cross-chains to the side-chains which may be quickly attached and detached without the necessity of tools.

Another object is to provide a novel connecting link of the class described which cannot possibly come off during service, and one which at the same time will have no deleterious effect upon the rubber of the tire.

A further object of the invention is the provision of a novel connecting link which may be easily and cheaply manufactured, and one which may be applied to all types of anti-skid chains.

These and further objects will be apparent after referring to the drawing, in which:

Figure 1 is an elevation of the device of the invention as applied to an automobile tire.

Figure 2 is an enlarged plan.

Figures 3, 4 and 5 are a plan and two side elevations, respectively, of the device of the invention as further enlarged to actual size.

Figures 6, 7 and 8 are views showing how the device is connected to a side-chain link.

Referring more particularly to the drawings, the numeral 2 designates a pair of spaced apart side-chains such as are used almost universally for anti-skid purposes. These side-chains 2 are composed of a plurality of links 3 defining sides 4 and closed-end portions 5.

A plurality of cross-chains 7 are transversely arranged with respect to the side chains 2 and are each composed of a plurality of cross-chain links 8, which are defined by sides 9 and closed end portions 10.

According to the teaching of the present invention, the cross-chains 7 are united or connected to the side chains 2 by means of a novel connector 12 which is made of suitable wire and defines a closed-end portion 13 together with converging open ends 14, which are provided with diverging opposite extending hook portions 15. The extremities 16 of the hook portions 15 are each extended toward the closed end 13 of the connector, and are beveled in that direction as indicated at 17.

These beveled extremities 17 define angles of approximately 30 degrees with respect to the longitudinal center-line of the extremities 16 of the hook portions 15. This condition permits the outer surfaces of the hook portions to have equal clearances, as distinguished from the usual sheared ends of the devices of the prior art which make frictional contact with the adjacent rubber tires.

Referring to Figure 6, it is to be noted that the inside diameters of the hook portions 15 are substantially equal to the widths of the openings therein, as defined by the positions of the extremities 16 with respect thereto. This condition permits the hook portions 15 to describe substantially true half-circles having diameters substantially the same as the thickness of the sides 4 of the side-chain links 3 of the chains.

This construction provides for a relatively snug connection between the connectors 12 and sides 4 of the side-chain links 3, with the result that the contact of the former with curbstones and other objects will not tend to close its hook portions 15. This factor precludes the possibility of the hooks 15 closing securely on the sides 4 of the side-chain links 3 in such a manner as to require the use of tools for their removal.

Most cross-chains 7 are made of twisted links which have a positive tendency to turn counterclockwise under all conditions of use. A close inspection of a worn link of this type, or one of the connectors by means of which they are joined to the side-chains, will appear to be worn more on the left-hand member of the hook, due to the counterclockwise twisting tendency. It is for this reason that the novel connector of the present invention is adapted to be applied to the side-chains in a counterclockwise manner; thus, precluding the possibility of its becoming loose or disengaged due to the natural twisting tendency of the side chains.

Referring to Figure 6 of the drawing, the hook portions 15 of the connector 12 are vertically alined with respect to the adjacent side 4 of a side chain link 3. While in this relationship, the connector 12 is moved in such manner that the hooks 15 will move over and under the side 4 to the position shown in Figure 7. The connector 12 is then rotated counter-clockwise, as shown in Figure 8, until the hook portions 15 snugly engage the side 4 of the side-chain link 3. The connector 12 can only be removed by clockwise twisting, which is an unnatural movement for the cross-chain 7.

While I have shown and described one specific embodiment of my invention it will be understood that I do not wish to be limited thereto, since various modifications may be made without departing from the scope thereof, as defined in the appended claims.

I claim:

1. As an article of manufacture, an anti-skid chain for vehicle wheels comprising, in combination, a pair of side chains and a plurality of cross-chains, said cross-chains being adapted to exert a uni-directional torque in use, each of said cross-chains being provided at its ends with a connecting link for connecting said cross-chains to the links of said side-chains, each of said connecting links comprising an open loop structure including a closed end portion and converging side portions terminating in diverging opposite extending hook portions, said hook portions having their free sides extended toward said closed end and being beveled in the same direction on an angle of approximately thirty (30°) degrees with respect to the longitudinal center line of the free sides of said hook portions, said hook portions being arranged to have an inside diameter substantially equal to the widths of the openings therein as defined by the positions of the free sides of said hook portions with respect thereto, the inside diameter of said hook portions and the length of the free sides of said hook portions and the widths of the openings in said hook portions being substantially equal to the thickness of the side bars of the side chain links to which they are adapted to be secured so as to positively prevent closing of said hook members around said side bars regardless of the extraneous forces which may be applied to said free sides, said hook portions being disposed to straddle the side bar of the side-chain link to which the connecting link is to be connected and to simultaneously engage said side bar when straddling the same upon being rotated in the same direction as said torque is exerted in said cross chains.

2. A connecting link for connecting separate elements in a chain link structure wherein one of said elements is an elongated articulate body adapted to exert a uni-directional torque when tensioned, said link being fastened to said above defined elongated articulate body and adapted to be removably connected to a link of a second element, said link comprising an open loop structure including a closed end portion and converging side portions terminating in diverging opposite extending hook portions, said hook portions having their free sides extended toward said closed end and being beveled in the same direction on an angle of approximately thirty (30°) degrees with respect to the longitudinal center line of the free sides of said hook portions, said hook portions being arranged to have an inside diameter substantially equal to the widths of the openings therein as defined by the positions of the free sides of said hook portions with respect thereto, the inside diameter of said hook portions and the length of the free sides of said hook portions and the widths of the openings in said hook portions being substantially equal to the thickness of the side bars of the link of the element to which they are adapted to be secured so as to positively prevent closing of said hook members around said side bars regardless of the extraneous forces which may be applied to said free sides, said hook portions being disposed to straddle the side bar of the link of the element to which they are adapted to be secured and to simultaneously engage said side bar when straddling the same upon being rotated in the same direction as said torque is exerted in said elongated articulate body.

3. A link for use with an anti-skid tire chain and adapted for use in connecting separate elements in said chain, said link comprising an open elongated loop, one end of said loop being closed, the other end of said loop being opened and provided with converging side bars, a divergent extension carried by the end of each of said convergent side bars, said divergent extensions being shaped to provide oppositely facing hooks which occupy planes angularly disposed to the planes of divergence of said extensions, the openings of said hooks being shaped and of such size as to conform substantially to the section of the chain element to which they are to be attached, and the free sides of said hooks having a length not substantially greater than the cross-sectional dimension of said chain element so as to positively prevent closing of said hooks around said chain element whereby said hooks may be readily engaged and disengaged from said chain element without the necessity of distorting said hooks.

4. A link for use with an anti-skid tire chain and adapted for use in connecting separate elements in said chain, said link comprising an open elongated loop, one end of said loop being closed, the other end of said loop being opened and provided with converging side bars, a divergent extension carried by the end of each of said convergent side bars, said divergent extensions being shaped to provide oppositely facing hooks which occupy planes angularly disposed to the planes of divergence of said extensions, the openings of said hooks being shaped and of such size as to conform substantially to the section of the chain element to which they are to be attached, the free sides of said hooks having a length not substantially greater than the cross-sectional dimension of said chain element and having their terminal ends beveled so as to positively prevent closing of said hooks around said chain element whereby said hooks may be readily engaged and disengaged from said chain element without the necessity of distorting said hooks.

5. A link for use with an anti-skid tire chain and usable to connect separate elements in said chain, one of the elements to be connected comprising an elongated articulate body adapted to exert uni-directional torque when tensioned, said link comprising an open loop including a curved portion for engaging an end of the elongated articulate body, side portions extending from said curved portion, each of said side portions being formed adjacent their free ends into oppositely extending hooks, said hooks being spaced apart with respect to each other for straddling a bar member and being disposed to simultaneously engage said side bar member when straddling the same upon being rotated in the same direction as said torque is exerted in said elongated articulate body, said hooks having bar receiving openings of a size and shape to snugly fit said bar member and having their free sides of a length not substantially greater than the cross-sectional dimension of said bar so as to positively prevent closing of said hooks around said chain element whereby said hooks may be readily engaged and disengaged from said chain element without the necessity of distorting said hooks.

HERBERT W. SAMUELSON.